Figures 1, 2, 3:
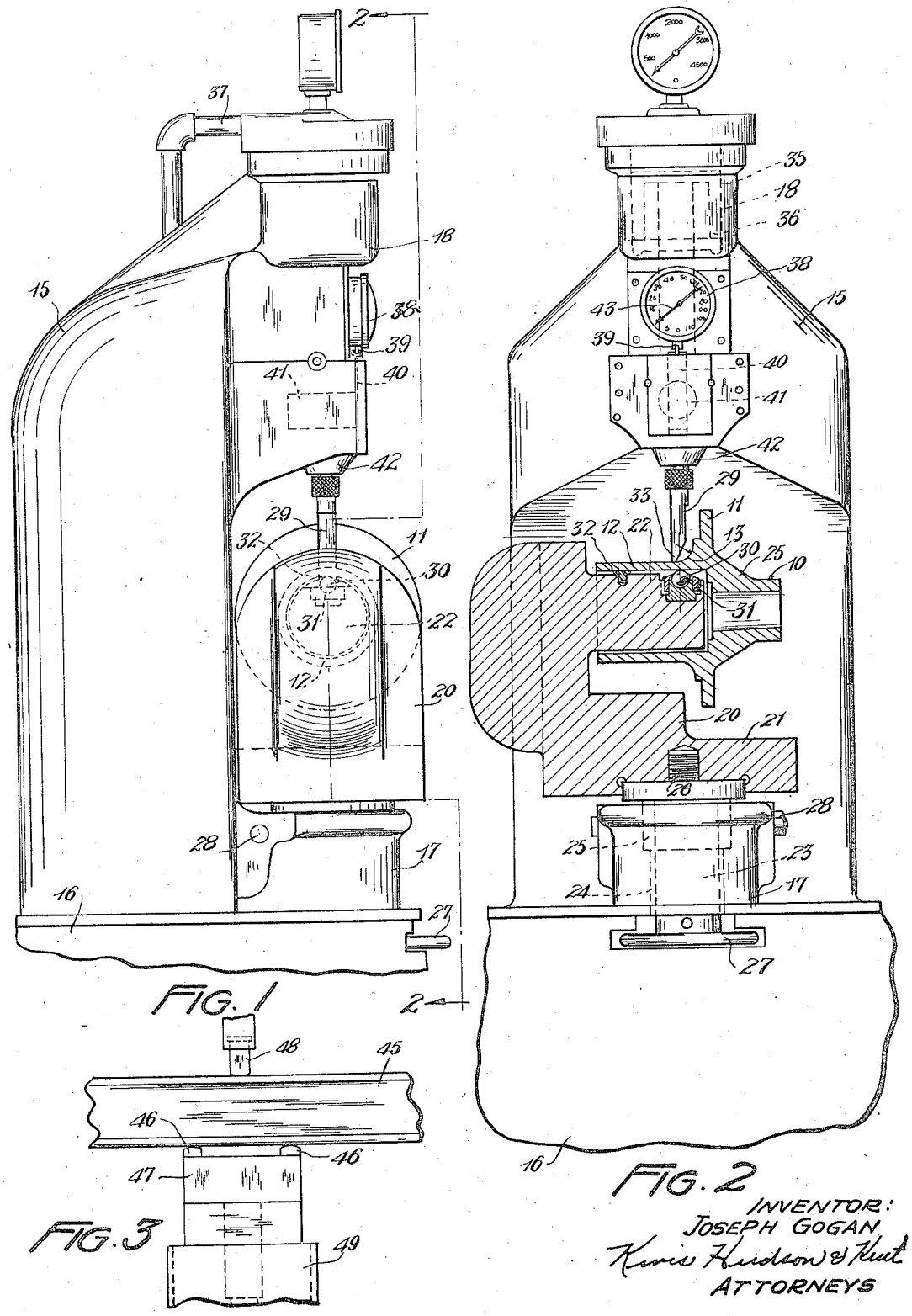

April 21, 1936.  J. GOGAN  2,038,487

APPARATUS FOR TESTING INDIVIDUAL BODIES

Filed March 16, 1933

INVENTOR:
JOSEPH GOGAN
Kwin Hudson & Kent
ATTORNEYS

Patented Apr. 21, 1936

2,038,487

UNITED STATES PATENT OFFICE 2,038,487

APPARATUS FOR TESTING INDIVIDUAL BODIES

Joseph Gogan, Lakewood, Ohio

Application March 16, 1933, Serial No. 661,150

5 Claims. (Cl. 265—12)

This invention has to do with the testing of materials, as to hardness or other characteristics, and aims to provide improved apparatus for testing individual bodies in rapid succession without impairing or destroying the utility of such bodies.

An object of the present invention is to provide a novel apparatus for testing individual bodies, in accordance with the operation of which a predetermined load is applied to a body eccentrically to the point at which said body is engaged by a support, and the distortion thereby produced in the body is measured for comparison with the corresponding distortion produced by the same predetermined load in a body of known characteristic.

Another object of the present invention is to provide a novel apparatus for testing the hardness of individual bodies, wherein a body is applied to a support having means thereon for engaging the body at spaced points, including a fulcrum and a penetrator spaced from said fulcrum, and wherein a predetermined load is applied to the body eccentrically to said penetrator and the distortion produced in the body is measured for comparison with the corresponding distortion produced by said predetermined load in a body of known characteristic.

It is also an object of this invention to provide improved apparatus for testing individual bodies, wherein a support is provided with means thereon for engaging a body at spaced points, and means movable relative to the support is adapted to engage the body eccentrically to the spaced means of the support for applying a predetermined load to the body, one of said means being a penetrator, and wherein means is provided for measuring the total distortion produced in the body.

A further object of this invention is to provide improved apparatus for testing individual hollow bodies, wherein a mandrel having a penetrator and a fulcrum spaced from said penetrator, is adapted to extend into a hollow body, and wherein means is provided for applying a predetermined load to the body eccentrically of said penetrator, such apparatus also including means for measuring the total distortion produced in the body.

Other objects and advantages of the invention will be apparent from the following description, when taken in conjunction with the accompanying sheet of drawings, wherein Fig. 1 is a side elevational view of improved testing apparatus, embodying my invention.

Fig. 2 is a front elevational view of the apparatus with the work supporting means thereof in section, and Fig. 3 is an elevational view showing the application of my invention to the testing of other bodies.

Detailed reference will now be made to the accompanying drawing, wherein I have illustrated a preferred form of my improved apparatus for testing the hardness of individual bodies. It will be understood, of course, that my invention may be embodied in various other forms of testing apparatus coming within the scope of the present disclosure.

According to my invention, as will be explained more fully hereinafter, I apply a predetermined load to a body to be tested at a point on that body which is offset from, or in other words, eccentric to a pair of spaced body engaging supports, to thereby cause a penetrator to be pressed into the body at the point where the hardness or other characteristic of the material is to be tested. By pressing the penetrator into the body by means of such an eccentrically applied predetermined load, I find that the distortion produced in the body comprises, in part, a deflection or springing of the body within the elastic limit of the material, and, in part, a penetration of the body by the penetrator. By measuring the total distortion produced by the predetermined load, and comparing such total distortion with the corresponding distortion produced by said predetermined load in a similar body of known characteristic, the comparative hardness of the body under consideration can be determined.

Before entering into a detailed description of my novel apparatus, I shall describe briefly one type of test body to which my apparatus is especially applicable, but it will be understood, of course, that my invention is not limited to the testing of this particular form of body, but may be used in testing various pieces of material. The body illustrated in this instance is a wheel hub 10 having a flange portion 11 and a tubular portion 12 coaxial with, but extending away from, the flange portion. When this hub is embodied in a wheel structure, an anti-friction bearing is positioned within the tubular portion adjacent the flange portion, and the test to be made on this body is to determine whether or not the material is sufficiently hard at this point. The wheel hub 10 is here shown as constructed with an annularly extending concave portion or fillet 13 which reenforces the body at the junction of the flange with the tubular portion. Since this annular fillet overlies that portion of the tubular member on which the test is desired, the test cannot be readily made on the outer surface of the tubular portion, nor can the predetermined load be readily applied to the outer surface of the tubular portion at this point when the test is to be made on the inner surface of the tubular portion. As will be explained more fully hereinafter, I have discovered that a very accurate comparative test can be made on bodies, such as the test body 10, by applying the predetermined load to the body at a point eccentric to the support or fulcrum engaging the body.

Although various specific forms of testing apparatus may be employed in carrying out my invention, I have illustrated in Figs. 1 and 2 of the drawing, improved testing apparatus which I have found to be very satisfactory. This improved testing apparatus is preferably in the form of a self-contained machine having a frame 15 supported upon a suitable mount 16. The frame may be of any suitable form of construction, but is here shown as being of the gap type, having a laterally extending base portion 17, and a laterally extending head portion 18 which is disposed in vertically spaced relation with respect to the base portion 17.

The laterally extending base portion 17 provides a support upon which the work holding fixture 20 may be mounted. This fixture may be of any suitable form, depending upon the size and shape of the bodies to be tested, and, in this instance, is shown as comprising a bracket-like body having a foot portion 21 and a laterally extending mandrel 22 spaced above the foot portion. For conveniently connecting this fixture with the base portion 17, in such a way that the mandrel may be adjustably positioned relative to the head portion 18 of the frame, I provide a vertical adjusting screw 23, which extends through an opening 24 in the frame and through a clamping nut 25 mounted in the base portion 17. The work supporting fixture 20 is suitably connected to the upper end of the adjusting screw, as by means of the threaded connection 26. The screw 23 may be rotated, for the purpose of adjusting the height of the mandrel 22, by means of the hand wheel 27, which is pinned or otherwise secured to the lower end of the adjusting screw. The screw may be retained in the desired position of adjustment by tightening the nut 25, as by means of the tangent clamping bolt or screw 28.

The mandrel 16 may be of any suitable form so that when the body to be tested is applied thereto, such body will be in position for the application of a predetermined load thereto by the movable member 29 of the testing machine. The mandrel is here shown as being of substantially cylindrical cross-sectional shape, so as to extend into the tubular portion 12 of the body to be tested, and is provided, adjacent its outer end with a penetrator 30. Such penetrator may be of any appropriate form according to the nature of the test being made, but in this instance is a hardened steel ball, such as the ball customarily used in making a Brinell hardness test. The penetrator is mounted on the mandrel so as to engage that portion of the body which is desired to be tested, and may be connected to the mandrel by providing the latter with a suitable retaining chuck 31. The mandrel is also provided with a support or fulcrum 32, which is spaced from the penetrator and is preferably located with its axis in the vertical plane which passes through the axis of the load applying member 29 and the center of the penetrator 30. This fulcrum may be of any appropriate form to cooperate with the penetrator 30 in correctly positioning the test body, and in this instance is constructed as a hardened button, which is connected to or mounted on the mandrel with its upper surface ground or shaped to conform with the shape of that portion of the test body which it is to engage, such that the top of the fulcrum lies in substantially the same horizontal plane as the top of the penetrator 30.

As shown in Fig. 2 of the drawing, the annular fillet portion 13 of the body to be tested overlies the penetrator 30. If the load applying member 29 were to engage this fillet portion an accurate test could not be made, because the applied load would be resolved into different force components, and the desired effective predetermined load could not be obtained. For the performance of an accurate test it is necessary that the predetermined load be applied to the body in such a manner that the total distortion resulting in the body from such predetermined load can be accurately measured. According to my invention the predetermined load is applied to the test body with the axis of the load applying member 29 offset from, or in eccentric relation to the axis of the penetrator, and the total distortion is then measured for comparison with the corresponding distortion produced by that same predetermined load in a body of known characteristic.

The force applying member 29 may be of any suitable shape or form and is here shown as having a tapered body engaging portion or tip 33, which contacts with the tubular portion of the body inwardly of the annular fillet portion 13 and in eccentric relation to the axis of the penetrator 30. The predetermined force thus applied causes the body to be distorted, such distortion comprising in part a deflection or springing of the body, and in part a permanent distortion produced by the penetrator 30 being pressed into the material.

For actuating the member 29 to apply the predetermined load and for measuring the total distortion produced in the body by the predetermined load, any satisfactory arrangement of testing apparatus may be employed, but I prefer to accomplish these functions by means of testing apparatus of the type disclosed in detail in my co-pending application, Serial Number 654,988, filed February 3, 1933 and issued July 23, 1935 as Patent No. 2,009,316. The testing machine illustrated in Figs. 1 and 2 of the accompanying drawing embodies the apparatus disclosed in said copending application, and for purposes of disclosure of the present invention it is explained that the head portion 18 of the frame is constructed with a fluid pressure cylinder 35 therein, having a piston 36 which is operatively connected with and actuates the load applying member 29. Pressure fluid supplied to the cylinder 35 through the connection 37, actuates the piston 36 and causes the member 29 to engage and distort the test body. A load of predetermined value is obtained by regulating means forming a part of the machine, which regulating means prevents the pressure of the motive fluid from exceeding a predetermined value.

The means for measuring the distortion produced in the test body includes a depth gauge or indicator 38, which is mounted on the head portion of the frame, and which is provided with an actuating stem 39. A magnetizable indicator operating member 40 is pivotally connected to the stem 39, and extends downwardly adjacent the pole of an electromagnet 41. This electromagnet is preferably mounted in and movable with the slide 42, which is operably connected with the piston 36 and on which the load applying member 29 is mounted. The magnet 41 is arranged to be energized substantially simultaneously upon engagement of the member 29 with the body to be tested, and when energized attracts the gauge actuating member 40 and thereby renders the gauge responsive to further movement of the load applying member.

As the load applied by the member 29 increases to the desired predetermined value, distortion is produced in the test body, and since the gauge 38 is then operatively connected with the member 29 the gauge pointer 43 will visibly indicate to the operator the extent of such distortion.

By making a test on a body, in this instance a wheel hub similar to wheel hub 10, of known characteristic, which may be referred to as a standard test body, a certain reading will be obtained from the gauge 38, and the readings obtained during the tests subsequently made on other bodies, are compared with this initial reading to determine whether or not the bodies are of the desired characteristic. If the gauge readings obtained from the individual tests compare favorably with the gauge reading obtained during a similar test on the standard test body, the bodies are accepted as satisfactory, but when excessive variation is shown by the gauge reading the body is rejected as unsatisfactory. The total distortion indicated by the gauge when a test is made on the standard test body is made up, in part, by the spring or deflection in the body and, in part, by the permanent distortion caused by the penetrator being pressed into the body. If the individual bodies being tested are of the same hardness as the standard test body, these components will, in each case, be the same as is obtained in a test on the standard test body. If a piece being tested is softer than it should be the deflection component and the permanent distortion component will both be different than in a test on the standard test body and if the gauge shows the variation to be more than the allowable variation the piece is rejected by the operator.

It has been stated above that my invention can be readily applied to the testing of bodies other than wheel hubs and, in Fig. 3 of the drawing, I have shown my invention being used to test a vehicle axle 45. The axle is supported at spaced points on the supports 46, which are hardened parts carried by the anvil 47, so that a predetermined distorting force can be applied to the axle, in eccentric or offset relation to the supports, by the load applying member 48. The anvil is preferably mounted on an adjusting screw 49, which corresponds with the screw 23 shown in Fig. 2.

The predetermined load may be applied to the part being tested, and the resulting deflection may be measured, in a manner generally similar to that disclosed in connection with Figs. 1 and 2, and if the deflection produced in the axle 45 by the predetermined load is more or less than what it should be for an axle of proper hardness, the operator will be apprised of the fact that the axle does not conform with a desired standard.

From the foregoing description and accompanying drawing it should now be readily understood that I have provided a novel and improved apparatus for testing individual bodies in rapid succession, without impairing or destroying the utility of such bodies. It will also be readily understood that in accordance with my invention a predetermined load is applied to a test body in offset or eccentric relation to the point of engagement of a support with said body, to thereby cause distortion of the body, comprising, in part, a deflection within the elastic limit of the material of the body, and, in part, a permanent distortion due to the pressing of a penetrator into the body. By measuring this total distortion and comparing such measurement with the corresponding total distortion produced by said predetermined load in a body of known characteristic, it will be readily seen that a comparative test is obtained. By means of the apparatus which I have devised, it will be seen that accurate hardness tests can now be rapidly made on individual bodies which are of such intricate or peculiar shape that hardness tests could not be made thereon with the apparatus heretofore available.

While I have illustrated and described the apparatus of my invention in a detailed manner, it should be understood, however, that I do not wish to be limited to the precise steps of procedure and details of construction illustrated and described, but regard my invention as including such changes and modifications as do not involve a departure from the spirit of the invention and the scope of the appended claims.

Having thus described my invention what I claim is:

1. In testing apparatus the combination of a support having means for engagement with a test piece at spaced points, means adapted for engagement with the test piece at a point eccentric to said spaced points for applying a predetermined force to the test piece, a penetrator associated with one of such test piece engaging means and adapted to be pressed into the test piece by said predetermined force, and means for measuring the distortion produced in the test piece including both the deflection of the body and the penetration of the body produced by said predetermined force.

2. In testing apparatus the combination of a support having spaced means thereon for engagement with a test piece, means adapted to engage the test piece intermediate said spaced means for applying a predetermined force to the test piece, a penetrator associated with one of such test piece engaging means and adapted to be pressed into the test piece by said predetermined force, and means for measuring the distortion produced in the test piece including both the deflection of the body and the penetration of the body produced by said predetermined force.

3. In testing apparatus the combination of a support having spaced means thereon for engagement with a test piece, one of said means being a penetrator and another being a fulcrum, means adapted to engage the test piece eccentrically to said penetrator for applying a predetermined force to the test piece, and means for measuring the distortion of the test piece including the deflection produced therein by the eccentric application of force and the penetration of the test piece by said penetrator.

4. In apparatus for testing individual hollow bodies the combination of a support adapted to extend into a hollow body and having means for engagement with the body at spaced points, means movable relative to said support and adapted to engage said body eccentrically to the means of said support for applying a predetermined force to said body, one of such body engaging means being a penetrator adapted to be pressed into the body by said predetermined force, and means for measuring the resulting distortion of said body including the deflection produced by the eccentric application of force and the penetration of the body by the penetrator.

5. In apparatus for testing the hardness of hollow bodies, the combination of a mandrel adapted to extend into a body to be tested, said mandrel having means thereon for engagement with said body including a fulcrum and a penetrator spaced from said fulcrum, means for applying a predetermined force to said body including a member movable relative to the mandrel and adapted to engage said body eccentrically with respect to said penetrator, and means for measuring the resulting distortion of said body including the deflection produced by the eccentric application of force and the penetration of the test piece by the penetrator.

JOSEPH GOGAN.